US005489202A

United States Patent [19]

Eisinger

[11] Patent Number: 5,489,202
[45] Date of Patent: Feb. 6, 1996

[54] VIBRATION OF SYSTEMS COMPRISED OF HOT AND COLD COMPONENTS

[75] Inventor: Frantisek L. Eisinger, Demarest, N.J.

[73] Assignee: Foster Wheeler Energy Corporation, Clinton, N.J.

[21] Appl. No.: 191,377

[22] Filed: Feb. 2, 1994

Related U.S. Application Data

[62] Division of Ser. No. 973,022, Nov. 9, 1992, Pat. No. 5,349,813.

[51] Int. Cl.⁶ .............................. F23M 9/00; F02C 7/24
[52] U.S. Cl. .......................... 431/114; 60/725; 431/188
[58] Field of Search ................ 60/725, 748; 431/181, 431/183, 187, 188, 114

[56] References Cited

U.S. PATENT DOCUMENTS

| | | | |
|---|---|---|---|
| 4,255,971 | 3/1981 | Rosencwaig. | |
| 4,341,070 | 7/1982 | Clarke | 60/39.511 |
| 4,437,313 | 3/1984 | Taber et al. | 60/39.182 |
| 4,484,820 | 11/1984 | Rosencwaig. | |
| 4,489,553 | 12/1984 | Wheatley et al. | |
| 4,538,464 | 9/1985 | Wheatley et al. | |
| 4,558,737 | 12/1985 | Kuznetsov et al. | |
| 4,584,840 | 4/1986 | Baumann. | |
| 4,599,551 | 7/1986 | Wheatley et al. | |
| 4,625,517 | 12/1986 | Muller. | |
| 4,640,667 | 2/1987 | Trepp. | |
| 4,681,532 | 7/1987 | Chung | 431/188 |
| 4,708,638 | 11/1987 | Brazier et al. | 431/188 |
| 4,821,507 | 4/1989 | Bachmann | 60/39.182 |
| 4,858,441 | 8/1989 | Wheatley et al. | |
| 4,953,366 | 9/1990 | Swift et al. | |
| 4,974,416 | 12/1990 | Taylor | 60/748 |

OTHER PUBLICATIONS

Putnam, A. A., and Dennis, W. R., A Study of Burner Oscillations of the Organ–Pipe Type, Translation of the ASME, vol. 75, No. 1, 15–28 (Jan. 1953).
Radebaugh, R., A Review of Pulse Tube Refrigeration, Advances in Cryogenic Engineering, vol. 35, 1191–1205 (1990).
Rott, N., Damped and Thermally Driven Acoustic Oscillations in Wide and Narrow Tubes, Journal of Applied Mathematics and Physics (ZAMP), vol. 20, 230–243 (1969).
Rott, N., and Zouzoulas, G., Thermally Driven Acoustic Oscillations, Part IV: Tubes With Variable Cross–Section, Journal of Applied Mathematics and Physics (ZAMP), vol. 27, 197–224 (1976). (no month).
Rott, N., Thermoacoustics, Advances in Applied Mechanics, vol. 20, Academic Press (1980).
Wheatley, J., Hofler, T., Swift, G. W., and Migliori, A., Understanding Some Simple Phenomena in Thermoacoustics with Applications to Acoustical Heat Engines, American Journal of Physics, 53 (2), Feb. 1985, 147–162.
Feldman, K. T., and Carter, R. L., A Study of Heat Driven Pressure Oscillations in a Gas, Journal of Heat Transfer, Transactions of the ASTM, Aug., 536–541 (1970). (no month).
Gifford, W. E., and Longworth, R. C., Pulse–Tube Refrigeration, ASME Paper No. 63–WA–290 (Nov. 1963).
Kosten, G. J., Vibration of a Regenerative Gas Turbine Exhaust System, Presented at the American Gas Association Transmission Conference, May 17, 1–16 (1982). (no month).
Feldman, K. T., A Study of Heat Generated Pressure Oscillations in a Closed End Pipe, Ph.D. Dissertation, Mechanical Engineering, University of Missouri (Jan. 1966).
Feldman, K. T., Review of the Literature on Sondhauss Thermoacoustic Phenomena, Journal of Sound and Vibration, 7 (1), 71–82 (1968). (no month).
Feldman, K. T., Review of the Literature on Rijke Thermoacoustic Phenomena, Journal of Sound and Vibration, 7 (1), 83–89 (1968). (no month).
Alster, M., Improved Calculation of Resonant Frequencies of Helmholtz Resonators, Journal of Sound and Vibration, vol. 24 (1), 63–85 (1972). (no month).
Chu, B. T., Pressure Waves Generated by Addition of Heat in a Gaseous Medium, National Advisory Committee for Aeronautics, Technical Note 3411, 1–47 (Jun. 1955).
Culick, F. E. C., Stability of Longitudinal Oscillations with Pressure and Velocity Coupling in a Solid Propellant Rocket, Combustion Science and Technology, Gordon and Breach Science Publishers, vol. 2, 179–201 (1970). (no month).

*Primary Examiner*—Richard A. Bertsch

*Assistant Examiner*—William Wicker
*Attorney, Agent, or Firm*—Marvin A. Naigur

[57] ABSTRACT

A system and method for resisting thermoacoustic oscillations in systems comprised of hot and cold components is disclosed. More particularly, a combined cycle power generation system 32 having a gas turbine 40, a gas turbine discharge duct 34, and a gas turbine recuperator 36 and 38 is disclosed. The system 32 is designed to resist severe thermoacoustic oscillations over its entire load range by providing for an asymmetrical arrangement of the hot section L-1, including the gas discharge duct 34 and the plenum 36 of the recuperator, and the cold section L-1, including the heat exchange tubes 38 of the recuperator. Also disclosed is a steam generation system 42 having a plenum 46, a burner 48, and a furnace 44. The steam generation system 42 is also designed to resist severe thermoacoustic oscillations by providing for an appropriate burner length L and by providing for an asymmetrical arrangement of a hot burner section L-1 and a cold burner section 1 within the burner 48. Alternative means are also disclosed for avoiding severe thermoacoustic oscillations in the combined cycle generation system and in the steam generation system by disrupting or avoiding the modified Sondhauss effect in those systems.

3 Claims, 4 Drawing Sheets

VIBRATION OF SYSTEMS COMPRISED OF HOT AND COLD COMPONENTS

This is a divisional of application(s) Ser. No. 07,973,022 filed on Nov. 9, 1992, now U.S. Pat. No. 5,349,813.

BACKGROUND OF THE INVENTION

This invention relates to power generation plants, and, more particularly, to a system and method of operating power generation plants so as to be resistant to thermoacoustic oscillations over the entire load range of such plants.

Combined cycle power generation systems are well known in the art and typically involve the combustion of natural gas or oil under pressure for the generation of hot gases which are passed through a gas turbine where the hot gases expand and cool while performing work in the generation of electrical power. The turbine exhaust gases are passed to a heat exchanger for the generation of high temperature steam which is used by steam turbines to perform additional work.

Often, severe thermoacoustic oscillations are encountered during the cold start-up of the gas turbine in which large pressure pulsations occur between the turbine discharge duct and heat recovery area. These oscillations result in severe structural vibration of the ducting from the turbine to the heat exchanger and surrounding structures, including the turbine. Such thermoacoustic oscillations typically result in the shut-down of the turbine. After numerous starts and subsequent shut-downs of the turbine, the vibrations disappear and the turbine operates without further thermoacoustic oscillations.

Similarly, utility steam generators are well known. In this type of arrangement, one or more burners are usually disposed in communication with the interior of a furnace and operate to combust oil or fuel gas in the presence of air to produce heat that is utilized to convert water to steam. The combustion air for the burners is typically discharged from a plenum towards a combustion zone, which is usually located immediately adjacent to the furnace wall. Perturbations in the stability of the combustion zone often result in the excitation of a strong acoustical oscillation in the furnace.

Severe thermoacoustic oscillations are typically characterized by the presence of well developed acoustical standing waves in the furnace, generating high sound levels and causing structural vibration of the furnace walls. Because of noise considerations, as well as concern for the structural integrity of the furnace, it is undesirable for severe thermoacoustical oscillations to take place within the operating range of the steam generator.

In general, systems which include hot and cold interconnected enclosures that are filled with gas may be subject to significant thermoacoustic oscillations. The driving force for such instabilities is the thermal energy fed or withdrawn from the system. The phenomenon of acoustic vibration or pressure oscillations in a gas caused by a constant heat source is characterized in two ways—each named after its discoverer—Sondhauss oscillations and Rijke oscillations. The Sondhauss pressure oscillation occurs when heat is added (either externally or internally) to a gas-filled tube having at least one end closed and no net flow of gas through the tube (Sondhauss, 1850). The Rijke oscillation occurs when heat is added to an internal grid located in the lower half of a vertical tube having both ends open, with flow of gas upward through the tube (Rijke, 1859).

Thermoacoustic oscillations are known to occur in various industrial installations, but they are generally difficult to diagnose. They occur either in their pure Sondhauss or Rijke form or also in a modified form such as described in the present invention. Thermoacoustic oscillations are occasionally considered a desired phenomenon in such applications as pulsed combustion. However, in a vast majority of applications, particularly in combustion processes, severe thermoacoustic oscillations are considered an unwanted phenomenon because of the generation of loud noise, or the induction of structural fatigue and damage, or both.

SUMMARY OF THE INVENTION

It is therefore an object of the present invention to provide a power generation plant that is resistant to severe thermoacoustic oscillations over the entire load range of the plant.

It is a further object of the present invention to provide a system of the above type in which a heat generating source is connected to a heat exchanger in a manner that is resistant to severe thermoacoustic oscillations over the entire load range of the system.

It is a still further object of the present invention to provide a system of the above type in which the heat generating source is a gas turbine and in which the heat exchanger is a gas turbine recuperator.

It is a still further object of the present invention to provide a system of the above type in which the gas turbine and the gas turbine recuperator resist severe thermoacoustic oscillations during cold start-up of the system.

It is a still further object of the present invention to provide a steam generation system in which a plenum, burner, and furnace configuration is provided which is resistant to severe thermoacoustic oscillations over the entire load range of the system.

It is a still further object of the present invention to provide a system of the above type in which the length of the burner and the location of an air swirler within the burner is selected to resist severe thermoacoustic oscillations over the entire load range of the system.

It is a still further object of the present invention to provide a system of the above type in which the burner is provided with means for disrupting or avoiding a modified Sondhauss effect to thereby resist severe thermoacoustic oscillations over the entire load range of the system.

Toward the fulfillment of these and other objects, the present invention features a combined cycle power generation system which is designed to resist severe thermoacoustic oscillations over its entire load range by an asymmetrical arrangement of the heat exchanger and the gas turbine exhaust ducts. Alternatively, other means of disrupting or avoiding a modified Sondhauss effect are provided thereby rendering the combined cycle power generation system resistant to severe thermoacoustic oscillations over the entire load range of the system. Similarly, a steam generation system, including a plenum, burner, and furnace, is designed to be resistant to severe thermoacoustic oscillations over its entire load range by selecting an appropriate burner length and by using an asymetrical arrangement of components. Alternatively, other means of disrupting or avoiding a modified Sondhauss effect are provided thereby rendering the steam generation system resistant to severe thermoacoustic oscillations over the entire load range of the system.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
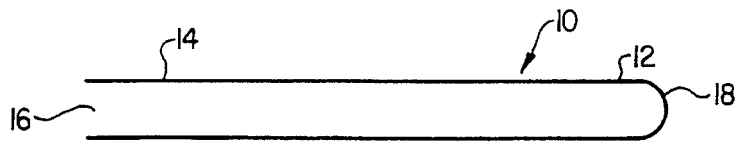
FIG. 1 is a schematic view depicting a Sondhauss tube forming a thermoacoustic oscillator.

Referring to FIG. 1, the reference numeral 10 refers in general to a Sondhauss tube which is composed of a relatively hot section 12 having an average temperature $T_h$ and a relatively cold section 14 having an average temperature $T_c$. The average temperatures $T_h$ and $T_c$ are the average temperatures at any particular time across the lengths of the hot section 12 and the cold section 14, respectively, and may vary over time. The Sondhauss tube 10 has an open end 16 formed in the proximal end portion of the cold section 14 and a closed end 18 at the distal end portion of the hot section 12. If the Sondhauss tube 10 is filled with a gas, such as air, an acoustical oscillation of the gas may be initiated by heating the section 12 or cooling the section 14 beyond some critical minimum temperature ratio, $T_h/T_c$, expressed as $\alpha_{cr}$, between the hot section 12 and the cold section 14. A complete description of the Sondhauss tube phenomenon is described in Rott, N., et al., "Thermally Driven Acoustic Oscillations, Part IV: Tubes with Variable Cross-Section," JAMP, Vol. 27, 197–224 (1976), the disclosure of which is incorporated herein by reference.

Figure 2:
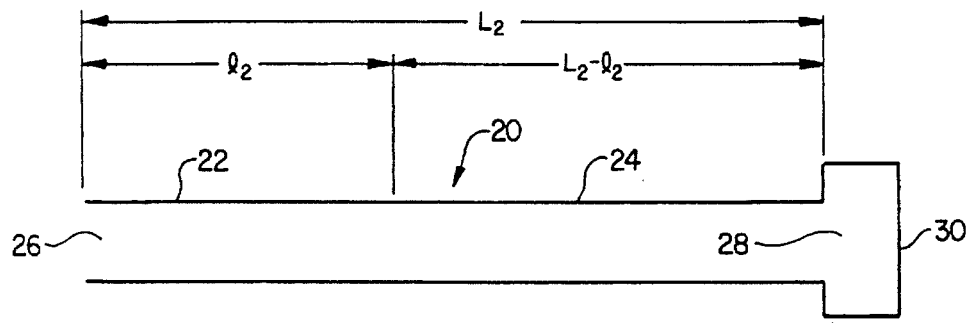
FIG. 2 is a schematic view depicting a modified Sondhauss tube of the present invention.

Referring to FIG. 2, the reference numeral 20 refers in general to a modified Sondhauss tube that has two distinctive features from the classical Sondhauss tube: (1) There is a net axial flow of gas through the modified Sondhauss tube 20, and (2) under appropriate circumstances, the net axial flow of gas initiates and significantly enhances the thermoacoustical oscillation of the gas in the tube.

The tube 20 has an overall length of $L_2$ which includes a relatively cold section 22 of length $l_2$ and a relatively hot section 24 of length $L_2$–$l_2$. The actual geometric layout need not be in a straight line as shown, but can be configured at right angles between sections, or any other angles, with bends and curved portions in the system as well. The shown straight length representation is equivalent to the effective length of the actual system. The tube 20 has two openings 26 and 28 formed in the proximal and distal end portions of the section 22 and 24, respectively. A heat source 30 is disposed at the distal end portion of the section 24 and is in gas flow communication with the tube 20 via the opening 28.

Examples of the heat source 30 include, but are not limited to, gas turbines and steam headers which form an acoustically "closed end," with maximum acoustic pressure, to the tube 20. Examples of the relatively cold section 22 include, but are not limited to heat exchangers, such as recuperators, air heaters, and steam generators which form an acoustically "open end," with minimum acoustic pressure. The hot section 24 may be a duct or a pipe connecting the heat source 30 to the relatively cold section 22.

As with the Sondhauss tube 10 of FIG. 1, a threshold or critical temperature ratio, $T_h/T_c = \alpha_{cr}$, between the hot section 24 and the cold section 22, respectively, is required to initiate severe thermoacoustic oscillations in the modified Sondhauss tube 20. If the temperature ratio is reduced below the critical temperature ratio, the severe oscillations stop. Thus, some minimum heat input or heat withdrawal is required to maintain the temperature ratio at or above the critical temperature ratio. As with the Sondhauss tube 10 of FIG. 1, the critical temperature ratio for the onset of thermoacoustical oscillations in the modified Sondhauss tube 20 is given by:

$$\alpha_{cr} = T_h/T_c \tag{1}$$

where $T_h$ and $T_c$ are the average absolute temperatures in Kelvin of the hot section 24 and the cold section 26, respectively.

The relative effective lengths of the hot section 24 to the cold section 22 are also important variables. A geometry parameter, $\xi$, can be used to describe the relative lengths of the hot section and the cold section of a two component system, such as the hot section 24 and the cold section 22 of the tube 20. The geometry parameter is given by:

$$\xi = \frac{L-l}{l} \tag{2}$$

in which $l$ is the effective length of the cold section, $L-l$ is the effective length of the hot section, and $L$ is the combined length of the cold and hot sections.

A curve or stability diagram defining the onset of severe thermoacoustic oscillations for the modified Sondhauss tube 20 is given by:

$$(\log \xi)^2 = 1.52 (\log \alpha_{cr} - \log \alpha_{min}). \tag{3}$$

Figure 3:
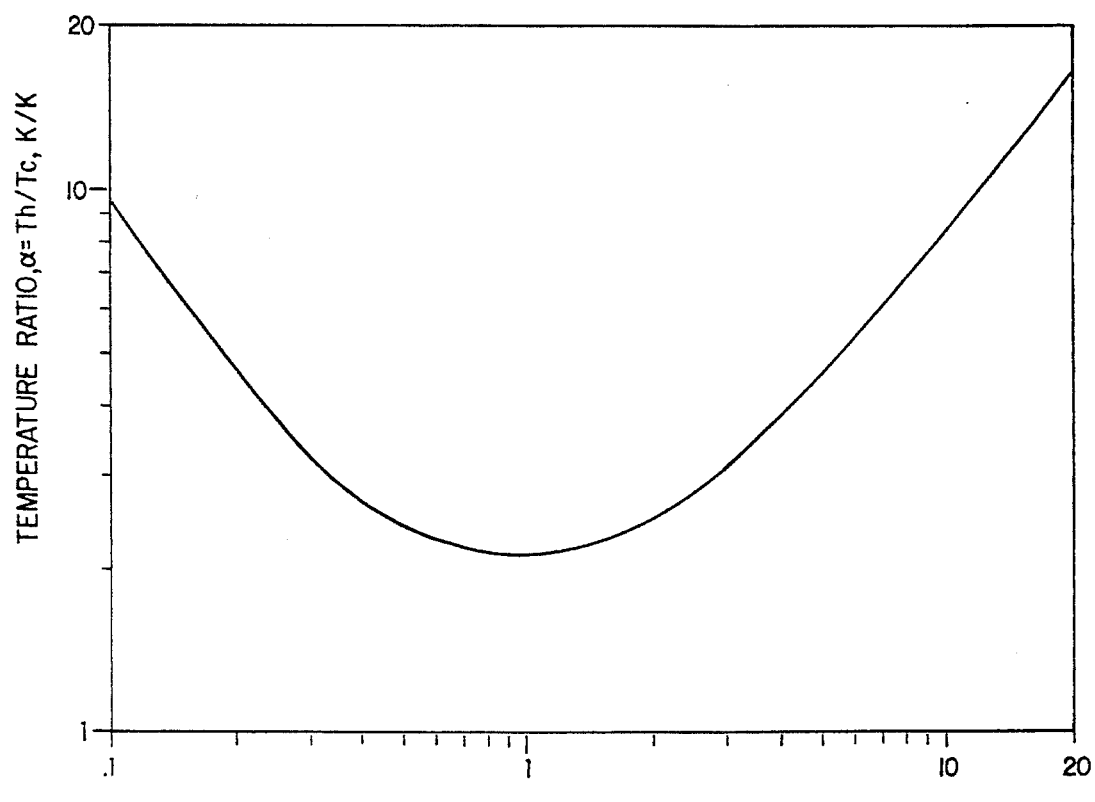
FIG. 3 is a graph depicting a stability diagram for the modified Sondhauss tube of FIG. 2.

Equation 3 defines a parabola which is illustrated by the curve in FIG. 3. In equation 3, $\alpha_{min}$ is the minimum value of $\alpha$, occuring at the vertex of the parabola at $\xi=1$, below which the system is not subject to severe thermoacoustic oscillations. This is also where the length of the cold section $l$ and the length of the hot section $L-l$ are equal, and hence, the modified Sondhauss tube 20 has the greatest symmetry.

For a given geometry parameter $\xi$, the system will be stable, without severe thermoacoustic oscillations, for those values of the actual temperature ratio $\alpha$ below the critical temperature ratio $\alpha_{cr}$ defined by the parabola of equation 3 and depicted in FIG. 3. When the temperature ratio $\alpha$ for a given geometry parameter $\xi$ reaches approximately the value $\alpha_{cr}$ or exceeds $\alpha_{cr}$, the system becomes unstable and severe thermoacoustic oscillations are expected.

Using equation 3 or the diagram of FIG. 3, a system may be designed which will be stable or unstable, as desired. To design such a system, %he extreme operational temperature limits of the relatively hot section 24 and the relatively cold section 22 are determined. From these values, the highest operational temperature ratio $\alpha_{max}$ of the system may be determined. Then, using equation 3 or the parabola of FIG. 3, a value of $\xi$ is selected which will give a stable or unstable system as desired. Equation 3 may be rearranged and equation 2 may be incorporated therein to give the following equation:

$$\log \alpha_{Cr} = \frac{\left(\log\left(\frac{L-l}{l}\right)\right)^2}{1.52} + \log \alpha_{min}. \quad (3A)$$

From this equation, appropriate values for l and L-l may be selected to provide the desired value for the critical temperature ratio $\alpha_{cr}$.

If a stable system is desired, a value of $\xi$ is selected so that the highest operational temperature ratio $\alpha_{max}$ of the system is less than the critical temperature ratio $\alpha_{cr}$ associated with the particular geometry parameter $\xi$, allowing an appropriate safety margin. If an unstable system is desired, a value of $\xi$ is selected at which the highest operational temperature ratio $\alpha_{max}$, or even a lower operational temperature ratio $\alpha$, of the system falls at or above the temperature ratio $\alpha_{cr}$ for the particular geometry parameter $\xi$. Once the geometry parameter is determined, appropriate values for l and L-l may be selected based upon equation 2 and design layout requirements. Rather than selecting values of $\xi$, equation 3B may be used and appropriate lengths of l and L-l may selected to provide the desired value for the critical temperature ratio $\alpha_{cr}$.

Figure 4A:
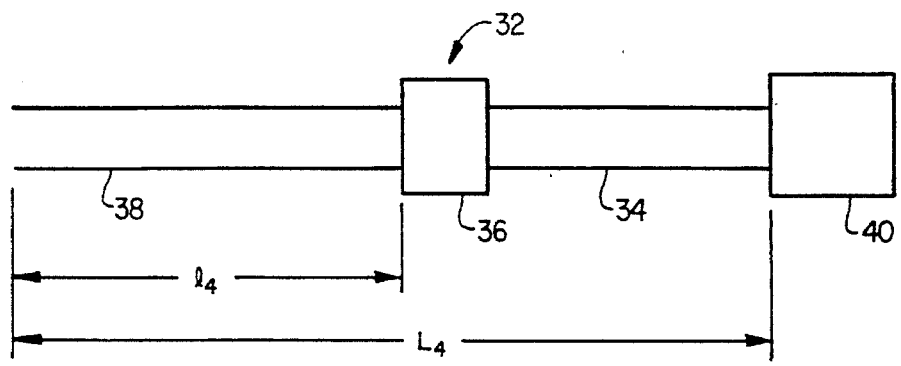
FIG. 4A is a schematic view depicting a combined cycle system of the present invention.

Referring to FIG. 4A, the reference numeral 32 refers in general to a combined cycle system which includes a discharge duct 34, a heat exchanger plenum 36 and a heat exchanger 38. A heat generating source, such as a gas turbine, provides thermal excitation which may give rise To severe thermoacoustic oscillations in the system 32. In a preferred embodiment, the plenum 36 and heat exchanger 34 comprise a gas turbine recuperator. The gas turbine recuperator 34 and 36 is a vertical tubular heat exchanger in which the heat exchange area, or the portion comprising the heat exchanger 34, has a plurality of tubes arranged in a triangular pitch pattern. The tubes are parallel to each other and are supported by two tubesheets at the lower and upper ends, and by support baffles at intermediate points. The tube bundle is located within a cylindrical shell. The plenum 36 is formed by a shell extension which provides a gas inlet chamber for receiveing exhaust gas from the gas turbine 40 via the discharge duct 34. The recuperator 34 and 36 is preferably of a counter flow type with gas flow from the gas turbine 40 on the tube side and air on the shell side. The hot turbine exhaust gas enters the tube bundle at the bottom and the cooled gas exits to the atmosphere at the top. The air enters the shell at the top and exits at the bottom.

A sample run of a combined cycle system 32 similar to that depicted schematically in FIG. 4A was performed using a system of the following dimensions. The system 32 comprising the discharge duct 34, the plenum 36, and the heat exchanger 38 had an overall effective length $L_4$ of 25.6 m, a cold section effective length $l_4$ of 13.4 m, which corresponds with the effective length of the heat exchanger 38, and a hot section effective length $L_4-l_4$ of 12.2 m, which corresponds with the combined effective length of the discharge duct 34 and the plenum 36. The onset of severe thermoacoustic oscillations occurred when the average gas temperature in the hot section was $T_h$=668.7 K and the average gas temperature in the cold section was $T_c$=311 K.

The geometry parameter $\xi_4$ and corresponding critical temperature ratio $\alpha_{cr4}$ may be determined using the above sample measurements:

$$\xi_4 = \frac{L_4 - l_4}{l_4} = \frac{25.6 - 13.4}{13.4} = 0.91,$$

and $$\alpha_{Cr_4} = \frac{T_h}{T_c} = \frac{668.7\,K}{311.0\,K} = 2.15.$$

Figure 5:
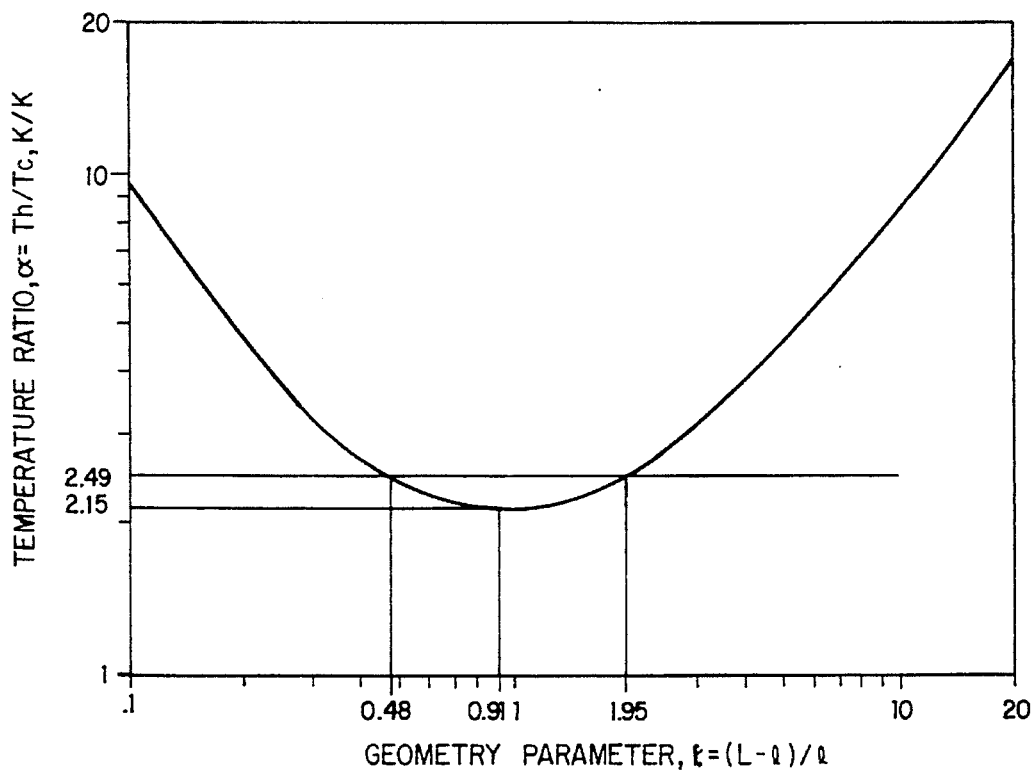
FIG. 5 is a graph depicting a stability diagram for the combined cycle system of FIG. 4A.

The parabola defined in equation 3 and depicted in FIG. 3 is reproduced in FIG. 5 which also includes values derived from the above sample. In the sample, the system having a geometry parameter $\xi_4$ of 0.91 became unstable, suffering severe thermoacoustic oscillations, at a temperature ratio of approximately 2.15. As shown in FIG. 5, this experimentally determined value for the temperature ratio $\alpha_4$ corresponds well with the predicted critical temperature ratio $\alpha_{cr4}$.

Using FIG. 5, it is seen that the system 32 may be made resistant to thermoacoustic oscillations by selecting a geometry parameter $\xi_4$ which corresponds with a value for the critical temperature ratio $\alpha_{cr4}$, which is greater than the observed experimental temperature ratio of 2.15, allowing an appropriate safety margin. For example, to provide a safety margin, a critical temperature ratio $\alpha_{cr4}$ of 2.49 may be selected which exceeds the observed experimental temperature ratio $\alpha_4$=2.15 by 16 percent. The geometry parameters $\xi_{4a}$=0.48 and $\xi_{4b}$=1.95 correspond with the selected critical temperature ratio $\alpha_{cr4}$=2.49. As illustrated in FIG. 5, at these values of $\xi_{4a}$ and $\xi_{4b}$, the observed experimental temperature ratio $\alpha_4$=2.15 falls comfortably below the critical temperature ratio $\alpha_{cr4}$ at which severe thermoacoustic oscillations would be expected.

Using equation 2 and the above values for $\xi_{4a}$ and $\xi_{4b}$, appropriate lengths for the hot section and the cold section may be determined. It is typically desirable to hold constant the length of the recuperator cooling tubes 38, the cold section effective length $l_4$. In the present sample holding the cold section effective length $l_4$ constant at 13.4 m enables the length of the hot section $L_4-l_4$, the combined length of the plenum 36 and the discharge duct 34, to be calculated using equation 2 to obtain $L_4-l_4$ values of 6.43 m or 26.1 m, respectively, for $\xi_{4a}$= 0.48 and $\xi_{4b}$=1.95. To allow for additional safety margins, the length of the hot section $L_4-l_4$, may be decreased below 6.43 m or increased above 26.1 m. The final selection of lengths may then be selected based upon overall design and layout considerations of the system 32.

To render the system 32 resistant to severe thermoacoustic oscillations over its entire load range, the maximum temperature ratio $\alpha_{max}$ of the system over its entire load range would be determined and the above selection procedure would be repeated to determine appropriate lengths for the hot and cold sections.

The system from the above experimental sample was operated at varying conditions including:

(1) cold start-up, during which both the recuperator 36 and 38 and the discharge duct 34 leading to it are in a cold condition at ambient temperature;

(2) warm start-up, during which the system 32 is in a warm or hot condition from previous operation or from preheating using an external heat source; and (3) normal operation with load and turbine speed changes as required with the system 32 in a hot condition.

During the test runs, severe thermoacoustic oscillations occurred during the cold start-up of the system. However, after warm-up, the severe thermoacoustic oscillations disappeared, and the system operated free of severe thermoacoustic oscillations within its entire speed and load range. It was observed that the temperature ratio $\alpha$ of the system equalled or exceeded the value α=2.15 only during cold start-up, and did not approach such values during other operations.

Figure 4B:
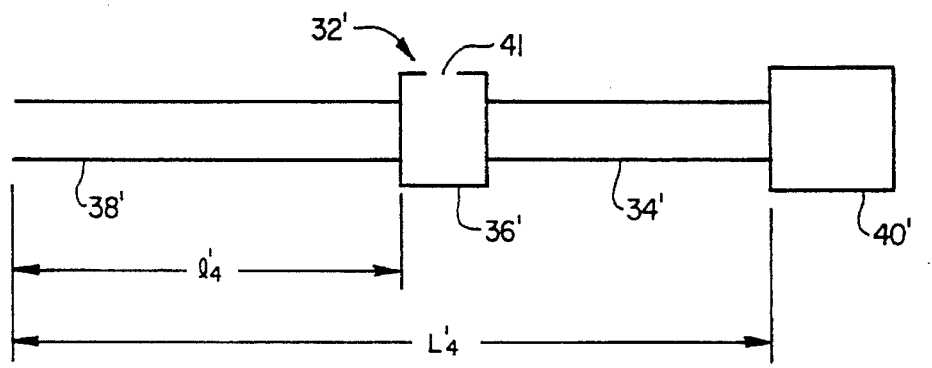
FIG. 4B is a schematic view depicting an alternate embodiment of the combined cycle system of FIG. 4A.

The results of the above test runs suggest that an alternate method of temporarily preventing severe thermoacoustic oscillations, for use only during cold start-up, may be used. Referring to FIG. 4B, to provide for such temporary prevention of severe thermoacoustic oscillations, the system described above was provided with closeable apertures 41 in the form of two 254 mm diameter pipes with flap covers attached to a manhole opening. The aperture 41 is disposed in the plenum so that, when in its open position, it releases a portion of the gases to the atmosphere. Severe thermoacoustic oscillations were avoided when the flap covers were opened for a period of time during cold start-up, until the recuperator was sufficiently warm. For this purpose, an automatic valve system may be used which opens during cold start-up and closes after the recuperator is warm, thereby eliminating the loss of a portion of the gases.

Other alternatives are also available for avoiding severe thermoacoustic oscillations in the system 32 during cold start-up. For example, by partially obstructing the exit from the recuperator or placing a silencer at the exit, it is possible to reduce the thermoacoustic oscillations. However, this may create a problem due to increased pressure drop. Also, screens, acoustic panels, baffles, and the like may be used in the discharge duct 34 to increase acoustic impedance and damping to the longitudinal waves in the duct 34. Here again, increased pressure drop may become a problem, and this can be aggravated by the fact that, at increased pressures, increased acoustic pressure waves may be detrimental. However, it may be possible to achieve a beneficial trade-off among the factors affecting the oscillations. Alternatively, the system 32, including the recuperator 36 and 38, may be preheated by an external heat source prior To start-up. This requires the availability of an external heat source, such as an operating similar system, which would be temporarily connected prior to start-up.

Figure 6:
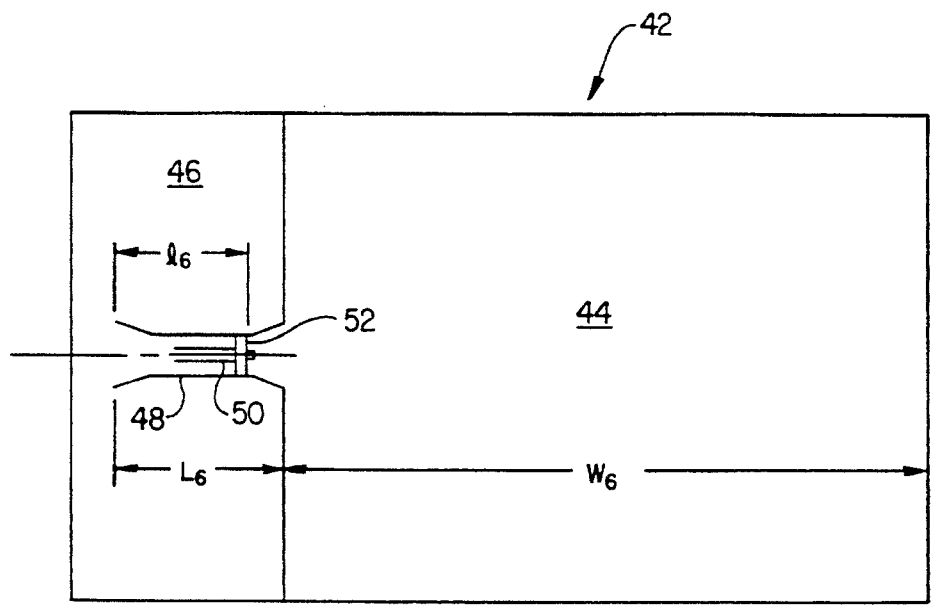
FIG. 6 is a schematic view depicting a steam generation system of the present invention.

As mentioned above, steam generators may also be subject to severe thermoacoustic oscillations which can be detrimental to their operation. Referring to FIG. 6, the reference numeral 42 refers in general to a steam generator that includes a furnace 44, a plenum 46 and a burner 48. The furnace 44 is disposed adjacent to the plenum 46 and shares a common wall therebetween. The burner 48 includes a fuel supply line 50 and an air swirler 52. The distal end of the burner 48 registers with the plenum 46 and the proximal end of the burner 48 registers with an opening formed in the common wall between the furnace 44 and the plenum 46 so as to place the plenum 46 in gas flow communication with the furnace 44. The furnace 44 has a width $W_4$, and the burner has an overall length of $L_6$. The relatively cool portion of the burner, which extends from the distal end of the burner to the swirler 52, has a length of $l_6$, and the relatively hot portion of the burner, which extends from the proximal end of the burner to the swirler 52, has a length of $L_6-l_6$. As this type of an arrangement is conventional, it will not be described in any further detail.

According to the system of the present invention, severe thermoacoustical oscillations of the furnace 44 are considered a condition of resonant instability and may occur when the excitation frequency of the burner 48 coincides with the standing wave frequency in the furnace 44. Once initiated, a feedback mechanism typically occurs in which the pressure pulsation in the furnace 44 has a modulating effect upon the burner 48. The severe thermoacoustical oscillations and the resulting standing wave typically persist over a large range of furnace loads.

The fundamental frequency $F_h$ of the thermoacoustical oscillation in the furnace is given by:

$$F_h = n(C_h/2W_6) \quad (4)$$

wherein $C_h$ is the speed of sound in the furnace 44, $W_6$ is The width or depth of the furnace 44 and n is the mode number. The first mode frequency is used because experimental evidence indicates that the first mode, n=1, is primarily excited.

Similarly, the fundamental frequency $F_c$ of the acoustical oscillation of the air in the burner 48 is given by:

$$F_c = n(C_c/4L_6) \quad (5)$$

wherein $C_c$ is the speed of sound in the plenum side of the burner 48. The condition of resonant instability occurs when the standing wave frequency in the furnace 44 coincides with the excitation frequency of the burner 48, that is when:

$$F_h = F_c. \quad (6)$$

Substituting equations 4 and 5 into equation 6 yields:

$$\frac{C_h}{2W_6} = \frac{C_c}{4L_6}. \quad (7)$$

Since the speed of sound is directly proportional to the square root of the absolute temperature equation 7 becomes $$\frac{\sqrt{T_h}}{W_6} = \frac{\sqrt{T_c}}{2L_6}. \quad (8)$$

Using equation 1 and solving for $L_6$ yields $$L_6 = \frac{W_6}{2\sqrt{\alpha_{cr}}}. \quad (9)$$

Consequently, equation 9 must be satisfied for the condition of resonant instability. Conversely, for the steam generator 42 to be resistant to severe thermoacoustical oscillations, the overall length of burner 48 must be substantially longer or shorter than the length $L_6$ as defined in equation 9.

Figure 7:
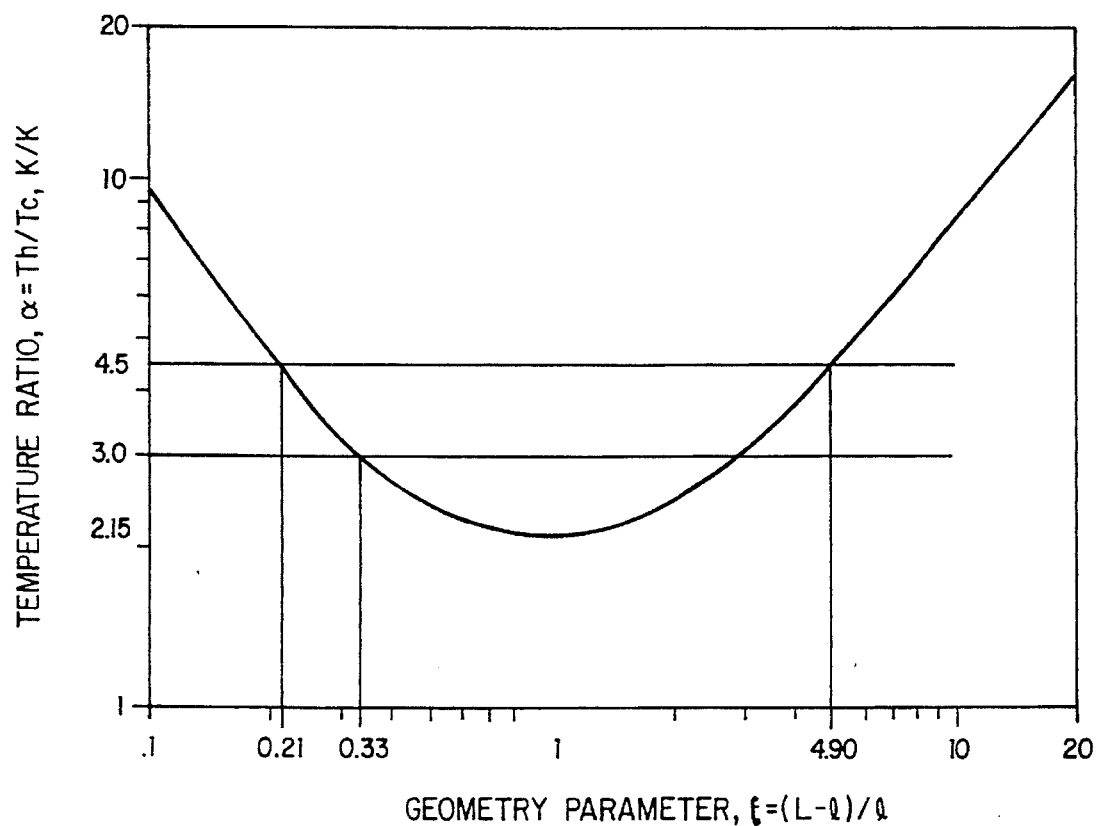
FIG. 7 is a graph depicting a stability diagram for the steam generator of FIG. 6.

To determine an appropriate length $L_6$ to resist severe thermoacoustic oscillations over the entire load range of the steam generating system 42, the maximum operating temperature ratio $\alpha_{max}$ for the system is determined. This value for $\alpha_{max}$ is then multiplied by a safety factor s (wherein s>1) to obtain a value for a desired critical temperature ratio $\alpha_{cr}$. Using the desired value for $\alpha_{cr}$ and equation 3, sample values for $\xi$ are calculated. As illustrated by FIG. 7, two values of $\xi$ will satisfy the equation, $\xi_1$ and $\xi_2$ wherein $\xi_1 \leq 1$ and $\xi_2 \geq 1$.

Once values for $\xi_1$ and $\xi_2$ are determined, the desired values for $L_6$ may be calculated as follows:

$$L_6 \geq \frac{\xi_1 + 1}{\xi_1}(L-l) \text{ or} \quad (10)$$

$$L_6 \leq \frac{\xi_2 + 1}{\xi_2}(L-l). \quad (11)$$

Sample test runs were performed using a typical steam generation system 42 similar to the one depicted schematically in FIG. 6 and having the following pertinent parameters for the furnace 44 and the burner 48:

Furnace 44:

| | |
|---|---|
| Furnace width or depth: | $W_6$ = 9.144 mm |
| Gas Temperature: | $T_h$ = 1407° C. + 273.16 = 1678K |

-continued

| | |
|---|---|
| Speed of Sound: | $C_h = 823$ m/s |
| Fundamental Frequency (first mode): | $F_h = 45$ $H_z$ |
| Burner 48: | |
| Length of Cold Section: | $l_6 = 1977$ mm |
| Overall length: | $L_6 = 2627$ mm |
| Air Temperature: | $T_c = 279°$ C. $+ 273.16 = 552$K |
| Speed of Sound: | $C_c = 472$ m/s |
| Fundamental Frequency (first mode): | $F_c = 45$ $H_z$ |

The temperature ratio at which severe thermoacoustic oscillation occurred was:

$$\frac{T_h}{T_c} = \frac{1678}{552} = 3.0. \quad (12)$$

Using this value as $\alpha_{cr}$, equation 9 predicts that the critical length of the burner 48 is:

$$L_{Cr_6} = \frac{9144}{2\sqrt{3.0}} = 2640 \text{ mm.} \quad (13)$$

The predicted critical length $L_{cr6}$=2640 mm corresponds closely with the actual length $L_6$=2627 mm at which severe thermoacoustic oscillations occurred.

Further, substituting the values for the burner 48 into equation 2 gives a value of the geometry parameter $\xi$ equal to 0.33, that is:

$$\xi_6 = \frac{L_6 - l_6}{l_6} = \frac{2627 - 1977}{1977} = 0.33.$$

The parabola defined by equation 2 and depicted in FIGS. 3 and 5 is reproduced in FIG. 7. FIG. 7 also includes values for $\alpha_6$ and $\xi_6$ from above. From FIG. 7, the geometry parameter $\xi_6$=0.33 gives a critical temperature ratio $\alpha_{cr6}$= 3.0. Again, the steam generator 42 is not stable as the actual temperature ratio is approximately equal to the predicted critical temperature ratio of the burner 48.

Using FIG. 7, it is seen that the steam generator 42 may be made resistant to severe thermoacoustic oscillations by selecting a geometry parameter $\xi_6$ which corresponds with a value of $\alpha_{cr6}$ greater than the observed experimental temperature ratio of $\alpha_6$=3.0, allowing an appropriate safety margin. For example, to provide an appropriate safety margin, a critical temperature ratio of $\alpha_{cr6}$=4.5 may be selected, which corresponds with geometry parameters of $\xi_{6a}$=0.21 and $\xi_{6b}$=4.9. Accordingly, values of $\xi_6$ should be selected so that $\xi_6$ is $\leq 0.21$ or $\xi_6 \geq 4.9$. Using equation 2 and the above values for $\xi_{6a}$ and $\xi_{6b}$, appropriate lengths for the hot section $L_6-l_6$, the cold section $l_6$, and the overall burner length $L_6$ may be determined. It is typically desirable in burner configurations to maintain as constant the length of the hot section $L_6-l_6$. Therefore, maintaining the hot section length constant at $L_6-l_6$=2627 mm–1977 mm=650 mm, allows the desired length of the cold section $l_6$ and the overall burner length $L_6$ to be determined. From equation 2, the length of the cold section may be either $l_6 \geq 3095$ or $l_6 \leq 132$ mm, respectively, for $\xi_{6a} \leq 0.21$ and $\xi_{6b} \geq 4.9$. This also leads to an overall burner length $L_6 \geq 3745$ mm or $L_6 \leq 132$ mm.

Figure 8A:
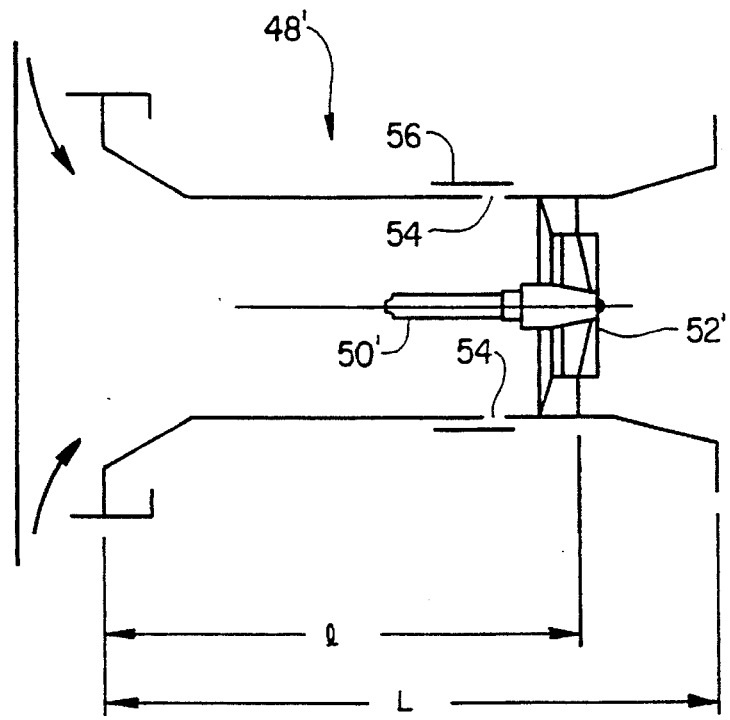
FIGS. 8A and 8B are enlarged, schematic views of alternate embodiments of the burner of the steam generation system of FIG. 6.

Similar to the combined cycle system 32 of FIG. 4B, the steam generation system 42 of FIG. 6 may be modified in other ways to prevent severe thermoacoustic oscillations. For example, the burner 48 may be provided with a swirler 52 which provides a high pressure differential. This will introduce acoustic damping between the furnace 44 and the burner 48 and reduce or eliminate the thermoacoustic oscillations. The pressure drop through the swirler 52 is preferably in the range of about 200 to 250 mm of water column (2.0 to 2.5 KPa). As another alternative, as shown in FIG. 8A, an additional air inlet 54 may be provided in the burner 48' in close proximity to the swirler 52', on the side of the swirler 52' closest to the distal end of the burner 48'. A slidable closure 56 is provided to permit the inlet 54 to be opened or closed or to allow the size of the inlet 54 to be adjusted. The open flow area of the second inlet should provide approximately 5% or more of the flow area through the burner 48. This additional air inlet 54 will act to reduce or eliminate the air tube resonant effect.

Figure 8B:
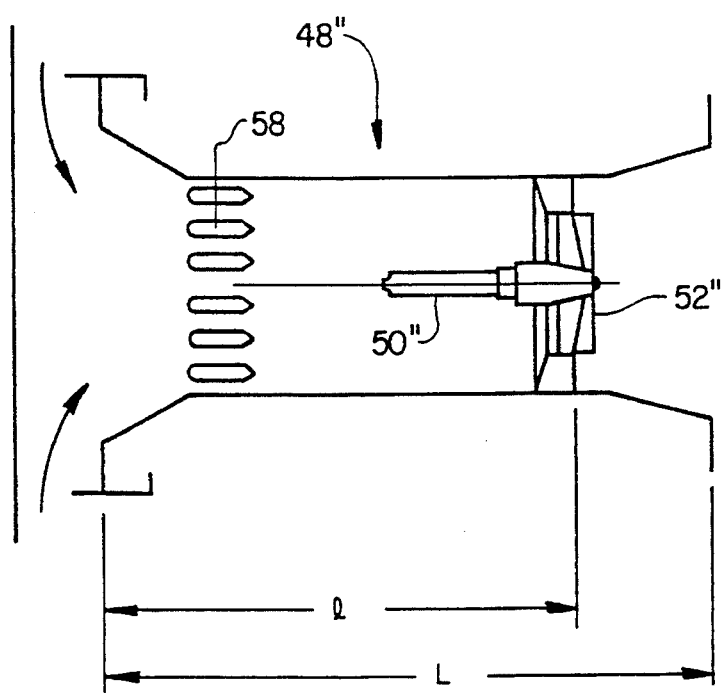

As shown in FIG. 8B, the burner 48" may be provided with acoustic damping means 58, such as screens or acoustic damping panels, near the distal end of the burner 48". The acoustic damping means 58 will interfere with the acoustic wave and will reduce or eliminate thermoacoustic oscillations. The sound transmission loss through the acoustic damping means 58 should be approximately 30 dB.

Additionally, the mode of fuel injection may be adjusted to enhance the formation of the precessing vortex core in the recirculation zone of the flame on the furnace side of the swirler 52. This will change the acoustic pressure distribution and interfere with the proper functioning of the modified Sondhauss effect. It is also beneficial to arrange gas fuel nozzles in the fuel supply line 50 in a combined radial and circumferential direction and to reduce the spray angle of the oil fuel nozzles. Adjustments to the fuel injection may be combined with the high pressure differential swirler 52 and/or with the provision of acoustic damping means 56.

Although the above discussions have been directed primarily to avoiding severe thermoacoustic oscillations, it is understood that there are situations in which such oscillations are desirable. It is occasionally desirable to create an acoustic driver which utilizes the modified Sondhauss effect. A few examples of practical uses of acoustic drivers include as a simple noise-producing device of variable noise intensity as well as other uses in various technological processes, such as:

(1) a cleaning device for cleaning complex surfaces from accumulated deposits;

(2) a mixing device in chemical and process industries;

(3) a driver enhancing acoustic agglomeration of particles in gases;

(4) in environmental system devices for control of undesired emissions; and (5) in pulsed combustion.

In such situations, the above teachings may be used in the design of acoustic drivers to ensure and enhance the production of such severe thermoacoustic oscillations.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A steam generating system for resisting severe thermoacoustic oscillations, comprising:

a furnace;

a plenum;

a burner having a first opening in a distal end of said burner and having a second opening in a proximal end of said burner, said distal end of said burner being in gas flow communication with said plenum and said proximal end of said burner being in gas flow communication with said furnace for passing air from said plenum through said burner to said furnace;

a swirler disposed within said burner for swirling said air as said air passes from said plenum to said furnace and for reducing thermoacoustic oscillations in said system;

a fuel inlet for introducing a fuel through said burner into said furnace; and, a third opening disposed in said burner in proximity with said swirler and between said first opening and said swirler, for introducing air into said burner to reduce the air tube resonant effect.

2. The system of claim 1 wherein said first, second and third openings in said burner provide a flow area for passing said gas air from said plenum to said furnace, and wherein said third opening is sufficiently large to provide at least 5% of a total inlet flow area, from said plenum into said burner, said total inlet flow area being equal to the cross-sectional area of said first opening plus the cross-sectional area of said third opening.

3. The system of claim 16 wherein said system includes a slidable closure to permit said third opening to be opened or closed and to permit the size of said third opening to be adjusted.

* * * * *

UNITED STATES PATENT AND TRADEMARK OFFICE
CERTIFICATE OF CORRECTION

PATENT NO. : 5,489,202

DATED : February 6, 1996

INVENTOR(s) : Frantisek L. Eisinger

It is certified that error appears in the above-identified patent and that said Letters Patent is hereby corrected as shown below:

In the Abstract:

Page 2, first column, line 10, change "section L-1" to --section 1-1--.

Column 4, line 64, change "%he" to --the--.

Column 5, line 33, delete "To" and insert --to--.

Column 7, line 50, change "$W_4$" to --$W_6$--.

Column 8, line 7, change "The" to --the--.

Column 8, formula (5), delete "$F_{c=n}(C_c/4L_6)$" and insert -- $F_c = n(C_t/4L_6)$ --.

Column 8, line 64, delete the line that runs from the left margin to the right margin.

Column 9, after "continued" delete the line that runs from the left margin to the right margin.

Column 9, line 5, before "Burner 48:" insert blank line.

Column 9, line 8, delete the period after "C" before the + sign.

Column 9, line 12, delete the line that runs from the left margin to the right margin.

UNITED STATES PATENT AND TRADEMARK OFFICE
CERTIFICATE OF CORRECTION

PATENT NO. : 5,489,202
DATED : February 6, 1996
INVENTOR(S) : Frantisek L. Eisinger It is certified that error appears in the above-indentified patent and that said Letters Patent is hereby corrected as shown below:

<u>In the Claims</u>:

Column 12, claim 3, line 1, change "16" to -- 1 --.

Signed and Sealed this

Fourth Day of November, 1997

*Attest:*

BRUCE LEHMAN

*Attesting Officer*       *Commissioner of Patents and Trademarks*